(12) United States Patent
Gundavelli et al.

(10) Patent No.: US 10,694,560 B2
(45) Date of Patent: Jun. 23, 2020

(54) INTEGRATING PRIVATE LTE RADIO SERVICE WITH WIFI ACCESS ARCHITECTURES

(71) Applicant: Cisco Technology, Inc., San Jose, CA (US)

(72) Inventors: Srinath Gundavelli, San Jose, CA (US); Vimal Srivastava, Karnataka (IN); Shree N. Murthy, San Jose, CA (US); Mark Grayson, Berkshire (GB)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/125,729

(22) Filed: Sep. 9, 2018

(65) Prior Publication Data

US 2020/0084810 A1 Mar. 12, 2020

(51) Int. Cl.
| | |
|---|---|
| *H04W 76/12* | (2018.01) |
| *H04W 12/06* | (2009.01) |
| *H04W 12/04* | (2009.01) |
| *H04W 80/04* | (2009.01) |
| *H04W 88/12* | (2009.01) |
| *H04L 29/08* | (2006.01) |
| *H04W 80/02* | (2009.01) |
| *H04W 88/06* | (2009.01) |

(52) U.S. Cl.
CPC .......... *H04W 76/12* (2018.02); *H04W 12/04* (2013.01); *H04W 12/06* (2013.01); *H04L 69/321* (2013.01); *H04W 80/02* (2013.01); *H04W 80/04* (2013.01); *H04W 88/06* (2013.01); *H04W 88/12* (2013.01)

(58) Field of Classification Search
CPC ..... H04W 76/12; H04W 12/06; H04W 12/04; H04W 80/04; H04W 88/12; H04W 69/321; H04W 80/02; H04W 88/06; H04W 36/0027; H04W 36/28; H04L 69/08
See application file for complete search history.

(56) References Cited

U.S. PATENT DOCUMENTS

| | | | | |
|---|---|---|---|---|
| 8,565,793 | B1 * | 10/2013 | Koodli .................. | H04W 68/04 370/329 |
| 9,137,171 | B2 | 9/2015 | Koodli et al. | |
| 2009/0054037 | A1 * | 2/2009 | Kaippallimalil ........ | H04L 63/08 455/411 |
| 2010/0290398 | A1 * | 11/2010 | Choudhary ........... | H04L 12/465 370/328 |
| 2012/0088472 | A1 * | 4/2012 | Pison .................... | H04W 88/10 455/411 |
| 2014/0029513 | A1 | 1/2014 | Takahashi et al. | |

(Continued)

FOREIGN PATENT DOCUMENTS

| | | | |
|---|---|---|---|
| WO | 2017135986 A1 | | 8/2017 |
| WO | WO2017135986 | * | 8/2017 |

*Primary Examiner* — Paul H Masur
*Assistant Examiner* — Michael K Phillips
(74) *Attorney, Agent, or Firm* — Patterson + Sheridan, LLP

(57) ABSTRACT

In one embodiment, a method is performed. An interworking module of a wireless local access network (LAN) controller may receive a non-access stratum (NAS) message from an access point (AP) device using a control and provisioning of wireless access protocols (CAPWAP) tunnel. The NAS message may be translated to a WiFi service layer message. The WiFi service layer message may be sent to a wireless control plane module of the wireless LAN controller.

20 Claims, 4 Drawing Sheets

(56) References Cited

U.S. PATENT DOCUMENTS

| | | | |
|---|---|---|---|
| 2014/0092742 A1* | 4/2014 | Chou | H04L 5/0073 370/235 |
| 2015/0172959 A1* | 6/2015 | Cucala Garcia | H04W 8/02 455/436 |
| 2016/0006736 A1* | 1/2016 | You | H04L 12/1403 726/4 |
| 2016/0021684 A1* | 1/2016 | Lewis | H04W 76/10 370/329 |
| 2017/0195930 A1 | 7/2017 | Tomici et al. | |
| 2018/0049275 A1* | 2/2018 | Agarwal | H04W 88/16 |
| 2018/0310240 A1* | 10/2018 | Kannan | H04W 48/20 |
| 2019/0124541 A1* | 4/2019 | Henry | H04L 12/66 |

* cited by examiner

INTEGRATING PRIVATE LTE RADIO
SERVICE WITH WIFI ACCESS
ARCHITECTURES

TECHNICAL FIELD

The present disclosure generally relates to interworking between private long term evolution (LTE) service and wireless network access architectures.

BACKGROUND

The Federal Communications Commission (FCC) created the Citizens Broadband Radio Service (CBRS), allocating radio spectrum in the 3550-3700 MHz band (e.g., 3.5 GHz band) for shared wireless broadband use by enterprises under certain sharing regulations. Enterprises can use this CBRS spectrum to set up private LTE networks and allow access to consumer and Internet of Things (IoT) devices. Enterprises may expand and increase the coverage density of private LTE networks by integrating CBRS into their wireless connectivity services.

BRIEF DESCRIPTION OF THE DRAWINGS

For an understanding of aspects of various embodiments described herein and to show how they may be carried into effect, reference is made, by way of example only, to the accompanying drawings.

DESCRIPTION OF EXAMPLE EMBODIMENTS

Overview

Figure 1:
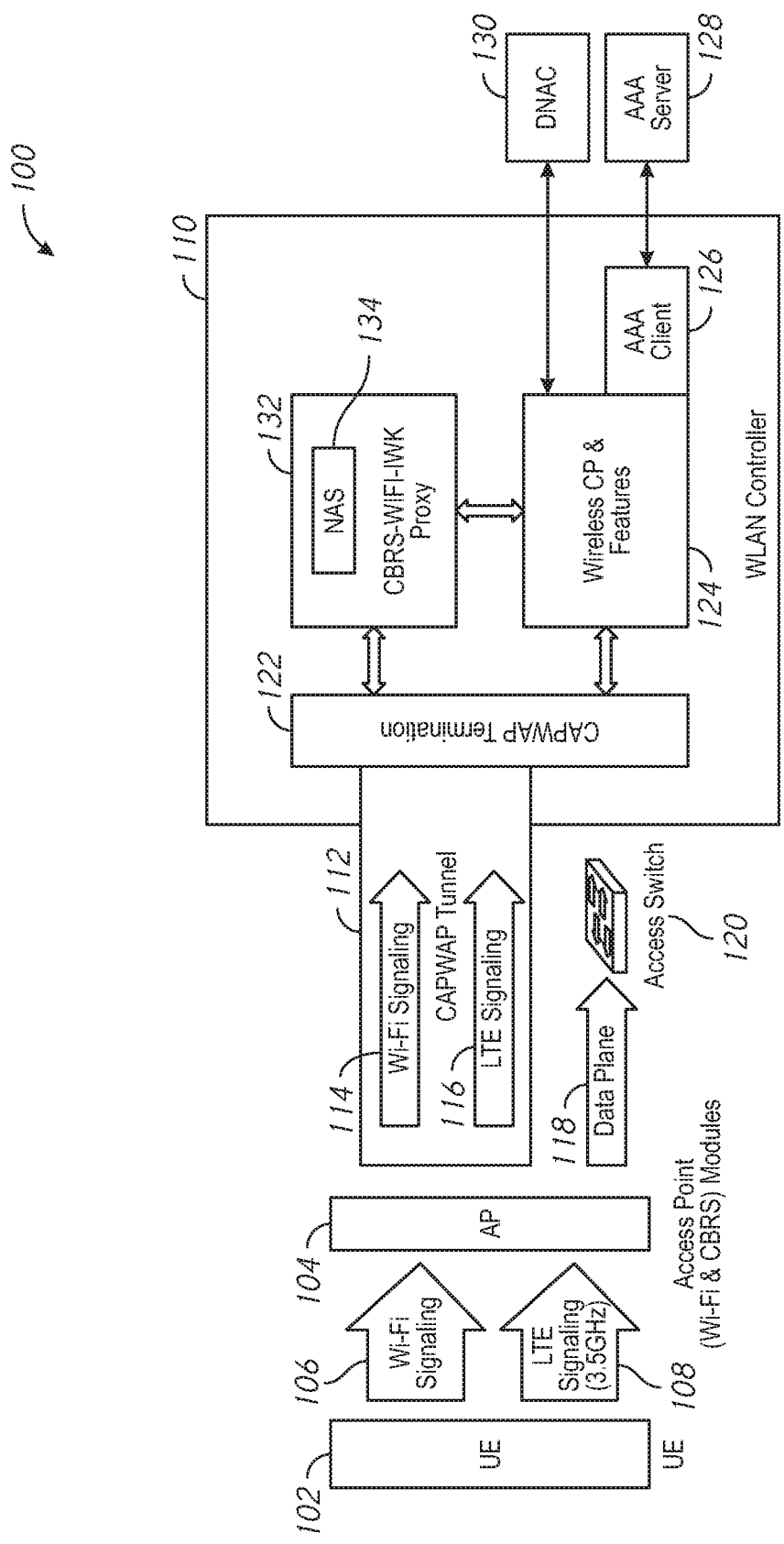
FIG. 1 illustrates an example system that may provide interworking between a private LTE (e.g., CBRS) user equipment (UE) device and a WiFi access network.

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example embodiments described herein.

Various embodiments disclosed herein may include devices, systems, and methods for integrating devices operating in a private LTE network, e.g., CBRS devices, may be integrated into a WiFi service layer without the need for an LTE core network.

In some embodiments, a method may be performed. An interworking module of a wireless local access network (LAN) controller may receive a non-access stratum (NAS) message from an access point (AP) device using a control and provisioning of wireless access protocols (CAPWAP) tunnel. The NAS message may be translated to a WiFi service layer message. The WiFi service layer message may be sent to a wireless control plane module of the wireless LAN controller.

Example Embodiments

Long Term Evolution (LTE) services in the 3.5 GHz band may work both indoors and outdoors and may be a premium wireless resource for enterprise applications. Radio signals in the 3.5 GHz spectrum may have limited propagation characteristics that may be compatible with indoor environments. Floor-by-floor deployment options may coexist with WiFi access networks.

Rules and regulations relating to CBRS band usage may make CBRS available for devices that use a LTE media access control (MAC) layer operating in the 3.5 GHz band. Devices that use a WiFi MAC layer operating in other frequency bands, such as the 2.4 GHz, 3.6 GHz, 4.9 GHz, 5 GHz, or 5.9 GHz frequency bands, may not be able to operate in the CBRS band. An enterprise deploying a CBRS-based private LTE network may be required to host and/or manage (e.g., all of) the complex 3GPP radio/core network functions, including, but not limited to, the policy and charging rules function (PCRF), the mobility management entity (MME), the packet data network gateway (PGW), serving gateway (SGW), access and mobility function (AMF), session management function (SMF), policy control function (PCF), and/or other 4G or 5G functions. Alternatively, an enterprise may engage a service provider to host the radio and the LTE service layer. These options may be expensive. Enterprise wireless service infrastructure may not be reused, and it may be difficult or impossible to realize a unified policy control.

In some embodiments, devices operating in a private LTE network, e.g., CBRS devices, may be integrated into a WiFi service layer without the need for an LTE core network. As used in this disclosure, "CBRS device" or "CBRS UE device" refers to a device that may operate in a private LTE network, which may be a CBRS network. CBRS devices may include, but are not limited to, user equipment (UE) devices and/or access point (AP) devices. Functions in the enterprise network may provide WiFi-type services and a unified policy control to CBRS UE devices.

The LTE MAC layer may be used. A CBRS UE device and a CBRS AP may use an air interface. A CBRS-WiFi interworking and proxy function may implement a mapping function. The mapping function may translate LTE service semantics to WiFi service semantics. The interworking and proxy function may be implemented in the CBRS access point. The interworking and proxy function may be implemented in the wireless local area network (WLAN) controller.

A CBRS UE device may operate as an LTE device. The functions that are providing the services may be the same functions that provide services to the WiFi devices in the enterprise network. For example, services such as network discovery, access authentication, PDN establishment/IP address configuration and quality of service (QoS) that may be supported in the LTE network, may be translated and terminated on WiFi functions.

In some embodiments, an interworking function may interwork with a UE device. The interworking function may interwork with a CBRS AP. The interworking function may interwork with the Wi-Fi control plane functions. The interworking function may normalize the session semantics between LTE and WiFi access systems. WiFi and CBRS devices may be unified into a single service layer.

Some network-initiated features may be masked. For example, network-initiated bearer QoS, emergency services, and other network-initiated features may be masked. A reduced feature set and reduced semantics may be used to maintain feature parity of a CBRS-based LTE session with a WiFi session. Basic network discovery, access authentication, PDN establishment/IP address configuration, and/or default bearer setup may be supported.

In some embodiments, a UE device may have awareness of the service layer. Non-access stratum (NAS) and internet protocol (IP) signaling may align with WiFi service semantics. There may be optimizations in the authentication mode. WiFi access authentication of a UE device may be bootstrapped for CBRS/LTE access authentication.

FIG. 1 illustrates an example system 100 that may provide interworking between a private LTE (e.g., CBRS) UE device and a WiFi access network. A UE device 102 may communicate with an AP device 104 using an air interface. The air interface may communicate a variety of signals, including, but not limited to, WiFi signals 106 or LTE signals 108. These signals may occupy different frequency bands. For example, the WiFi signals 106 may be transmitted in one or more of the 2.4 GHz, 3.6 GHz, 4.9 GHz, 5 GHz, or 5.9 GHz frequency bands. The LTE signals 108 may be transmitted in the 3.5 GHz frequency band. The UE device 102 may have an enterprise profile configured in it. The enterprise profile may enable the UE device 102 to discover the enterprise CBRS network.

The UE device 102 may be associated with a public land mobile network (PLMN). A PLMN may be uniquely identified by a PLMN identifier (PLMN ID). A PLMN ID may include a mobile country code (MCC) and a mobile network code (MNC). The UE device 102 may be associated (e.g., configured) with a private enterprise PLMN ID with a plurality of different authentication modes as supported in 3GPP TS 33.501. The UE device 102 may perform PLMN selection and may attach to an enterprise private LTE (e.g., CBRS) access point, such as the AP device 104, using the 3.5 GHz frequency band.

FIG. 1 illustrates the UE device 102 having WiFi and private LTE sessions terminated on a single AP device 104 having WiFi and private LTE radios. It will be appreciated that the WiFi session and the private LTE session may be terminated on different AP devices.

The UE device 102 may obtain an enterprise internet protocol (IP) configuration. An address configuration mode, such as an IPv6 SLAAC/DHCPv6-based address configuration mode, may be enabled to enable the UE device 102 to obtain the enterprise IP configuration.

The AP device 104 may communicate with a wireless local area network (WLAN) controller 110 via a control and provisioning of wireless access protocols (CAPWAP) tunnel 112. The AP device 104 may search for the WLAN controller 110 by sending a discovery request message. When the WLAN controller 110 receives the discovery request message, it may reply with a discovery response message. The AP device 104 and the WLAN controller 110 may establish a secure connection, e.g., using the Datagram Transport Layer Security (DTLS) protocol to exchange CAPWAP control and data messages. Control messages may include information and instructions related to WLAN management. Data messages may encapsulate forwarded wireless frames. Control and data messages may be sent over different User Datagram Protocol (UDP) ports. The CAPWAP tunnel 112 may carry WiFi signaling 114 and/or LTE signaling 116. The AP device 104 may also communicate via a data plane 118 with an access switch 120.

The CAPWAP tunnel 112 may communicate with a CAPWAP termination 122 that may reside in the WLAN controller 110. The CAPWAP termination 122 may communicate with a wireless control plane (CP) and features module 124.

The WLAN controller 110 may communicate via an authentication, authorization, and accounting (AAA) client module 126 with an AAA server module 128, for example, for authentication and key generation. The wireless CP and features module 124 may use authentication, authorization, and/or accounting functions to control access to services. The AAA client module 126 may exchange information, such as user credentials, keys, tokens, authorizations, etc. with the AAA server module 128.

The wireless CP and features module 124 may communicate with a software-defined networking (SDN) system 130. The SDN system 130 may be implemented, for example, as a Cisco digital network architecture controller (DNAC).

The AP device 104 may communicate with a CBRS-WiFi interworking and proxy module 132. For example, the AP device 104 may use the CAPWAP tunnel 112 and the CAPWAP termination 122 for sending control plane and/or user plane data to the CBRS-WiFi interworking and proxy module 132. The AP device 104 may use CAPWAP and/or virtual extensible LAN (VXLAN) tunneling modes.

The CBRS-WiFi interworking and proxy module 132 may interwork with the UE device 102 and with the AP device 104. The CBRS-WiFi interworking and proxy module 132 may interwork with WiFi control plane functions.

The CBRS-WiFi interworking and proxy module 132 may terminate the LTE signaling. The CBRS-WiFi interworking and proxy module 132 may normalize the LTE signaling for a WiFi service layer. The CBRS-WiFi interworking and proxy module 132 may receive and decode LTE signaling and may send an appropriate response, e.g., using WiFi semantics, to the wireless CP and features module 124.

The CBRS-WiFi interworking and proxy module 132 may provide non-access stratum (NAS) and/or S1 application protocol (S1AP) functionalities to the UE device 102. The CBRS-WiFi interworking and proxy module 132 may provide WiFi services and policy control. The CBRS-WiFi interworking and proxy module 132 may provide network discovery and/or address allocation functionality.

The CBRS-WiFi interworking and proxy module 132 may have a NAS module 134 that may decode NAS signaling. The NAS module 134 may communicate with the WLAN controller 110 to perform subscriber authentication and authorization, e.g., via the AAA client module 126 and the AAA server module 128. For example, the NAS module 134 may provide keys that may be in turn sent to the UE device 102 and/or the AP device 104. The keys may be used for NAS security, e.g., encryption and/or integrity, and/or security. The NAS module 134 may communicate with the WLAN controller 110 for packet data network (PDN) management.

Figure 2:
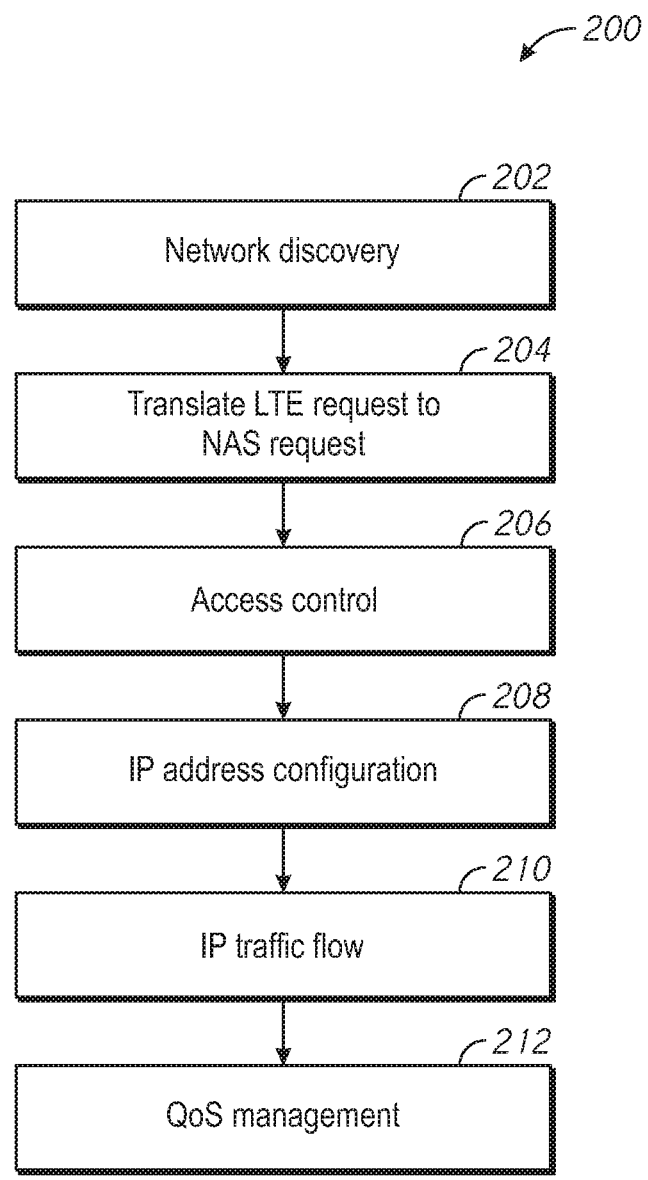
FIG. 2 is a process diagram that illustrates an example process flow for an example method that may be carried out by the system of FIG. 1.

FIG. 2 is a process diagram illustrating an example process flow for an example method 200 that may be carried out by the system 100. At 202, a UE device may perform network discovery. An AP device may receive an attach request from the UE device. The attach request may be an LTE attach request. At 204, the AP device may translate the LTE attach request to a NAS attach request or a PDN connectivity request and may send the translated LTE attach request to a wireless LAN controller.

At 206, the wireless LAN controller may perform access control. The wireless LAN controller may perform authentication to verify that user credentials match credentials in a database of authorized users, for example. The wireless LAN controller may perform authorization to verify that an authenticated user has permission to access resources to which the user is attempting to access.

At 208, the UE device, the AP device, and/or the wireless LAN controller may configure an internet protocol (IP) connection. The UE device, the AP device, and/or the wireless LAN controller may exchange IP traffic at 210. At 212, the wireless LAN controller may perform quality of service (QoS) management.

Figure 3:
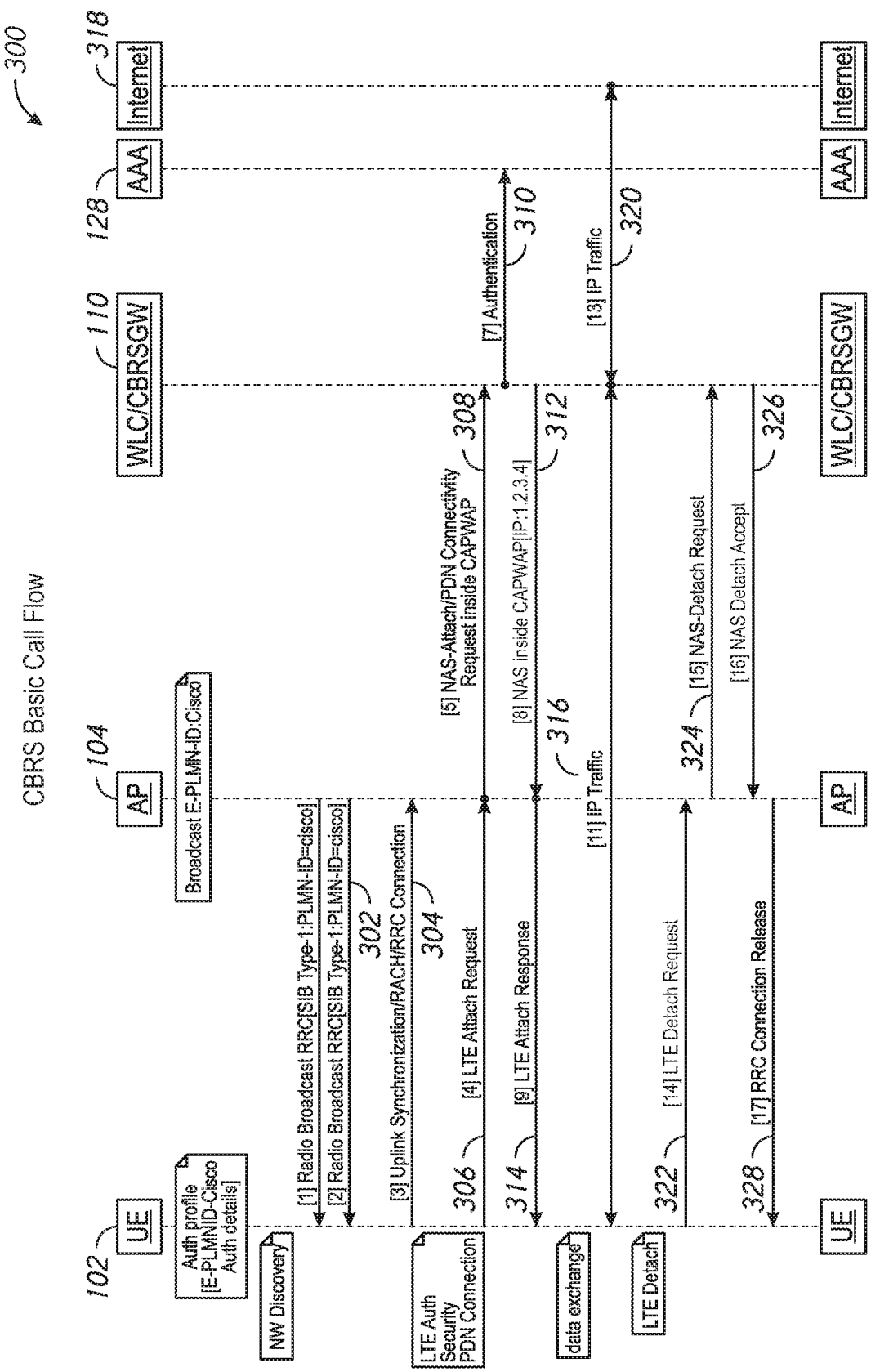
FIG. 3 is a process diagram that illustrates an example process flow for an example method that may be carried out by the system of FIG. 1.

FIG. 3 is a process diagram illustrating an example process flow for an example method 300 that may be carried out by the system 100. At 302, the AP device 104 may broadcast radio resource control (RRC) signaling to the UE device 102. The RRC layer may transfer messages of the non-access stratum (NAS), which is located above the RRC layer. The RRC layer may perform functions including, but not limited to one or more of broadcasting system information, paging, establishment and/or release of an RRC connection, transferring NAS information, access stratum (AS) security configuration, transferring UE radio access capability, measurement configuration and reporting, or mobility control. System information may include a number of information blocks in the RRC layer. System information may include a master information block (MIB) and one or more system information blocks (SIBs). System information may be used to communicate one or more parameters. For example, one or more SIBs may include a parameter that may identify a PLMN, e.g., "PLMN-ID=cisco".

At 304, the AP device 104 may receive uplink synchronization from the UE device 102. The UE device 102 may schedule and/or set up a random access channel (RACH). The UE device 102 may establish an RRC connection with the AP device 104.

The UE device 102 may obtain an IP address. At 306, the AP device 104 may receive an LTE attach request from the UE device 102. At 308, the AP device 104 may send a NAS attach request and/or a PDN connectivity request to the wireless LAN controller 110 or a private LTE (e.g., CBRS) gateway via the CAPWAP tunnel 112.

At 310, the wireless LAN controller 110 or private LTE gateway may perform authentication using the AAA client module 126 and the AAA server module 128. If the UE device 102 is properly authenticated, the wireless LAN controller 110 or private LTE gateway may determine whether the UE device 102 has any required permissions to access resources to which the UE device 102 may request access.

At 312, the wireless LAN controller 110 or private LTE gateway may exchange NAS signaling, e.g., NAS messages with the AP device 104 via the CAPWAP tunnel 112. At 314, the AP device 104 may send the UE device 102 an LTE attach response. The AP device 104 may establish an LTE session with the UE device 102. An IP address may be assigned to the UE device 102.

At 316, the UE device 102 may communicate IP traffic with the wireless LAN controller 110 or private LTE gateway. For example, the UE device 102 may send the wireless LAN controller 110 NAS signaling. The wireless LAN controller 110 may translate the NAS signaling to WiFi semantics, e.g., messages used by a WiFi service layer, and may determine an appropriate response to send back to the UE device 102.

The CAPWAP tunnel 112 may tunnel NAS messages from the UE device 102 over private LTE access to the CBRS-WiFi interworking and proxy module 132. The CAPWAP tunnel 112 may provide functionalities that may be provided by S1AP messages (e.g., UE and non-UE associated signaling).

The CBRS-WiFi interworking and proxy module 132 may interact with the wireless LAN controller 110 and may receive parameters that may be used for signaling procedures. NAS functions that are not related in the WiFi context may be disabled. User plane traffic from the UE device 102 may be routed from the AP device 104 using VXLAN encapsulation.

In some implementations, non-UE associated S1AP messages may be used for management of an S1AP tunnel between an eNB (E-UTRAN Node B, also known as Evolved Node B, abbreviated as eNodeB or eNB for the sake of brevity) device and a mobility management entity (MME) device. For example, such messages may be used for eNB/MME configuration transfers, traces, resets, and the like. The CAPWAP tunnel 112 may support non-UE associated S1AP messages.

In some implementations, UE-associated S1AP messages may be specific to a UE device. For example, such messages may be used for radio access bearer (RAB) management, paging, management of the security context between the UE device 102 and the eNB, and the like. The CAPWAP tunnel 112 may support UE-associated S1AP messages.

In some implementations, evolved packet system (EPS) mobility management (EMM) procedures (e.g., attachment, detachment, authentication, paging, TAU, GUTI reallocation, location reporting, etc.) may involve the use of signaling messages between a UE device and the MME device. The NAS module 134 may handle these signaling messages. The NAS module 134 may interface with the wireless LAN controller 110 for creating, modifying, and/or deleting state elements that may be used for realizing functionality associated with EMM procedures.

In some implementations, EPS session management (ESM) procedures may be used for establishing a PDN connection, default bearer, dedicated bearer, IP allocation, and the like. ESM procedures may involve the use of signaling messages between a UE device and the MME device. The NAS module 134 may handle these signaling messages. The CBRS-WiFi interworking and proxy module 132 may interface with the wireless LAN controller 110 for IP configuration and/or for communication of policy elements that may be used in establishing a PDN session.

The wireless LAN controller 110 may communicate with the internet 318 in determining the response to send to the UE device 102. IP traffic may be communicated between the wireless LAN controller 110 or private LTE gateway and the internet 318 at 320.

After data has been exchanged, the UE device 102 may send the AP device 104 an LTE detach request at 322 so that the LTE session may be ended and associated resources may be made available. The AP device 104 may send the wireless LAN controller 110 or private LTE gateway a NAS detach request at 324. At 326, the wireless LAN controller or private LTE gateway may send a NAS detach acceptance message to the AP device 104. The AP device 104 may send the UE device 102 an RRC connection release message at 328 to terminate the session and release resources that had been used during the session.

In some implementations, the UE device 102 may enter a low power or idle mode, e.g., RRC IDLE mode, to conserve power. The UE device 102 may be mobile while in the low power or idle mode and may transition from the coverage area of one AP device to the coverage area of another AP device while in the low power or idle mode. It may be difficult for the system 100 to determine the precise location of the UE device 102 in this circumstance.

In some implementations, the system 100 may use paging to determine the location of the UE device 102 if the UE device 102 is mobile while in the low power or idle mode. For example, the CBRS-WiFi interworking and proxy module 132 may configure, e.g., send a command or commands to, the CAPWAP tunnel 112 to cause the CAPWAP tunnel 112 to send a paging trigger to one or more AP devices. In some implementations, the CAPWAP tunnel 112 may send a paging trigger to all AP devices within range. The triggered AP device or devices may then send a paging message intended for the UE device 102.

In some implementations, when the UE device 102 is in RRC IDLE mode, the UE device 102 may periodically (e.g., once every discontinuous reception (DRX) cycle) monitor a physical downlink control channel (PDCCH) for an indicator, e.g., a paging radio network temporary identifier (P-RNTI). For example, the UE device 102 may check the PDCCH for the P-RNTI during a subframe specified by a parameter known as a paging occasion within the paging frame.

The P-RNTI may have a hexadecimal value of FFFE, for example, and may indicate that the UE device 102 may have a paging message intended for it on a physical downlink shared channel (PDSCH). If so, the UE device 102 may decode the PDCCH to determine resource allocation information. The UE device 102 may use the resource allocation information to determine which resource blocks (RBs) in the PDSCH to search for the paging message.

The UE device 102 may decode an RRC message from the PDSCH RBs and may determine whether an identifier associated with the UE device is in a paging record. If not, the UE device 102 may return to RRC IDLE mode and may wait until the next paging occasion to again check the PDCCH for a P-RNTI.

If the UE device 102 does find an identifier associated with it in the paging record, the UE device 102 may trigger a random access procedure and may establish a RRC connection. For example, the UE device 102 may send an RRC connection request message. The UE device 102 may receive an RRC connection setup message and may enter an RRC CONNECTED mode.

Figure 4:
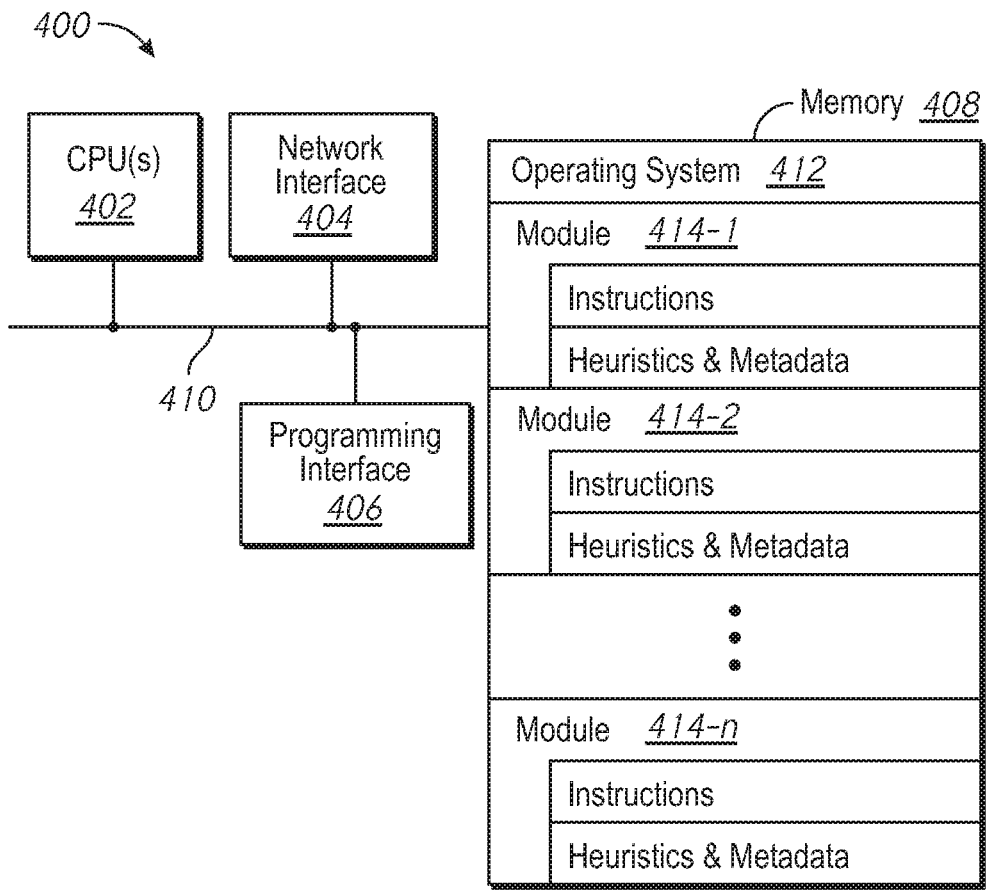
FIG. 4 is a block diagram that illustrates an example server system.

FIG. 4 is a block diagram of an example server system 400 enabled with one or more components of a device, server, or system in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the server system 400 may include one or more processing units (CPUs) 402, a network interface 404, a programming interface 406, a memory 408, and one or more communication buses 410 for interconnecting these and various other components.

The network interface 404 may be provided to, among other uses, establish and/or maintain a metadata tunnel between a cloud-hosted network management system and at least one private network including one or more compliant devices. In some implementations, the communication buses 410 may include circuitry that interconnects and controls communications between system components. The memory 408 may include one or more of high-speed random access memory, such as DRAM, SRAM, DDR RAM, or other random access solid state memory devices; and may include non-volatile memory, such as one or more magnetic disk storage devices, optical disk storage devices, flash memory devices, or other non-volatile solid state storage devices. The memory 408 may include one or more storage devices remotely located from the one or more CPUs 402. The memory 408 may comprise a non-transitory computer readable storage medium.

In some implementations, the memory 408 or the non-transitory computer readable storage medium of the memory 408 may include (e.g., store) the following programs, modules, and data structures, or a subset thereof including one or more of an operating system 412 or various modules 414-1, 414-2, . . . , 414-n. The modules 414-1, 414-2, . . . , 414-n, individually and/or collectively, perform one or more of the operations described herein. To that end, in various implementations, the modules 414-1, 414-2, . . . , 414-n may include respective instructions and/or logic, and heuristics and metadata.

Various aspects of implementations within the scope of the appended claims are described above. It should be apparent that the various features of implementations described above may be embodied in a wide variety of forms and that any specific structure and/or function described above is merely illustrative. Based on the present disclosure, one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
receiving a Long Term Evolution (LTE) non-access stratum (NAS) message from a User Equipment (UE) device at a WiFi access point (AP) device operating in an environment without an LTE core network;
sending the LTE NAS message from the WiFi AP device using a control and provisioning of wireless access protocols (CAPWAP) tunnel to a wireless local area network (WLAN) controller;
translating, at the WLAN controller, the LTE NAS message to a WiFi service layer message;
receiving, using the CAPWAP tunnel, a NAS response based on the WiFi service layer message at the WiFi AP device from the WLAN controller; and
sending, from the WiFi AP device to the UE device, an LTE attach response based on the NAS response.

2. The method of claim 1, further comprising sending a paging trigger to the WiFi AP device using the CAPWAP tunnel.

3. The method of claim 1, further comprising receiving at least one of control plane data or user plane data from the WiFi AP device using the CAPWAP tunnel.

4. The method of claim 1, further comprising:
decoding the LTE NAS message;
performing at least one of authentication or authorization relative to the UE device; and
performing packet data network (PDN) management relative to the UE device.

5. The method of claim 4, further comprising:
generating a key;
sending the key to an authentication, authorization, and accounting (AAA) server; and
sending the key to the UE device.

6. The method of claim 1, further comprising communicating internet protocol (IP) data traffic with the UE device configured with an enterprise profile.

7. The method of claim 6, wherein the UE device is configured with a private enterprise public land mobile network (PLMN) identifier with a plurality of authentication modes.

8. The method of claim 6, wherein the UE device is configured with at least one of an IPv6 SLAAC address configuration mode or a DHCPv6-based address configuration mode.

9. The method of claim 1, further comprising managing a private LTE session within a WiFi service layer.

10. A controller device comprising:
a network interface in communication with a WiFi network and not in communication with a Long Term Evolution (LTE) core;
a processor configured to execute computer readable instructions included on a non-transitory memory; and
the non-transitory memory including processor-readable instructions, that when executed by the processor, cause the controller device to:
receive an LTE non-access stratum (NAS) message for a User Equipment (UE) device via a control and provisioning of wireless access protocols (CAPWAP) tunnel with a WiFi Access Point (AP) device in communication with the UE device;
translate the LTE NAS message to a WiFi service layer message via an interworking module of the controller device; and
send, using the CAPWAP tunnel, a NAS response based on the WiFi service layer message to the WiFi AP device that enables the WiFi AP device to send an LTE attach response to the UE device.

11. The controller device of claim 10, wherein the processor-readable instructions cause the controller device to send a paging trigger to the WiFi AP device using the CAPWAP tunnel.

12. The controller device of claim 10, wherein the processor-readable instructions cause the controller device to receive at least one of control plane data or user plane data from the WiFi AP device using the CAPWAP tunnel.

13. The controller device of claim 10, wherein the processor-readable instructions cause the controller device to:
decode the LTE NAS message;
perform at least one of authentication or authorization relative to the UE device; and
perform packet data network (PDN) management relative to the UE device.

14. The controller device of claim 13, wherein the processor-readable instructions cause the controller device to:
generate a key;
send the key to an authentication, authorization, and accounting (AAA) server; and
send the key to the UE device.

15. The controller device of claim 10, wherein the processor-readable instructions cause the controller device to communicate internet protocol (IP) data traffic with the UE device configured with an enterprise profile.

16. The controller device of claim 15, wherein the UE device is configured with a private enterprise public land mobile network (PLMN) identifier with a plurality of authentication modes.

17. The controller device of claim 15, wherein the UE device is configured with at least one of an IPv6 SLAAC address configuration mode or a DHCPv6-based address configuration mode.

18. The controller device of claim 10, wherein the processor-readable instructions cause the controller device to manage a private LTE session within a WiFi service layer.

19. A non-transitory computer readable storage medium storing one or more programs, the one or more programs comprising instructions, which, when executed by a processor, cause performance of:
receiving, in an interworking module of a wireless local access network (WLAN) controller, a non-access stratum (NAS) message from an access point (AP) device via a control and provisioning of wireless access protocols (CAPWAP) tunnel, wherein the NAS message includes Long Term Evolution (LTE) signaling from a user equipment (UE) device and the AP device operates independently of an LTE core;
translating the LTE NAS message to a WiFi service layer message; and
sending, using the CAPWAP tunnel, a NAS response based on the WiFi service layer message to the AP device that enables the AP device to send an LTE attach response to the UE device.

20. The non-transitory computer readable storage medium of claim 19, wherein the instructions when executed by the processor further cause the WLAN controller to send a paging trigger to the AP device using the CAPWAP tunnel.

* * * * *